Oct. 7, 1969 R. G. CORBIN 3,471,115
REARVIEW MIRROR SUPPORT
Filed Sept. 19, 1967

INVENTOR.
Russel G. Corbin
BY
C. J. Biskup
ATTORNEY

3,471,115
REARVIEW MIRROR SUPPORT
Russel G. Corbin, Rochester, Mich., assignor to General Motors Corporation, Detroit, Mich., a corporation of Delaware
Filed Sept. 19, 1967, Ser. No. 668,897
Int. Cl. A47g 1/24
U.S. Cl. 248—483                    3 Claims

ABSTRACT OF THE DISCLOSURE

A rearview mirror assembly wherein a mounting bracket, attached to a vehicle, includes a semi-socket portion frictionally engaging a ball end formed at one end of a mirror support arm. A spring biases the ball end into engagement with the spherical surface while yieldingly permitting universal movement of the support arm when a force is applied thereto.

---

Recently, legislation has been enacted requiring vehicle interior rearview mirror mountings to conform to certain operational standards when installed in a motor vehicle. In addition to requiring provisions for universal tilting of the mirror element and a stable support mounting, the mirror mounting must also break away, deflect, or collapse when subjected to a predetermined force within a given area of application. Previous deflectable or collapsing rearview mirror supports have used twin ball and socket joints to permit collapsing of the mirror support relative to its mounting or "pop-out" mirror support arms that are designed to completely disengage from their mountings at a predetermined force level. While achieving the desired result of deflecting under predetermined loading conditions, once the loading has been removed, one difficulty with such mirror constructions has been that the support arm must be repositioned, reattached, or replaced.

The rearview mirror assembly, made in accordance with the present invention, satisfies legislative requirements and, in addition, provides a mirror structure that returns to its original position after the loading has been removed. In the present invention, a ball end, formed at the upper end of the mirror support arm, is universally supported within a semi-socket formed in a mirror mounting bracket. A compression spring, compressively retained between the mounting bracket and the support arm to the rear of the ball and socket connection, has its ends axially offset in a manner that causes lateral biasing of the ball end into frictional engagement with the socket. When the mirror element, attached to the lower end of the support arm, is subjected to a frontal or lateral force, the support arm yieldingly moves about the ball and socket connection against the biasing force of the compression spring. After the loading has been removed, the mirror support arm and the mirror element are automatically restored to the original position by the compression spring.

Accordingly, the objects of the present invention are: to provide a rearview mirror assembly wherein a support arm deflects when a frontal or lateral force is applied to the mirror element; to provide a deflectable rearview mirror assembly wherein the mirror support arm has an upper ball end laterally biased into engagement with a socket formed in a mirror mounting bracket in a manner that permits the support arm to rotate about the ball and socket connection when the mirror element is subjected to lateral or frontal loading and return to its initial position after the loading has been removed; and to provide a rearview mirror support arm wherein a mounting bracket, attached to the interior of a motor vehicle, has a socket portion universally supporting a ball end of the mirror support arm and wherein a spring, compressively retained between the mounting bracket and the support arm, laterally biases the ball end into frictional engagement with the socket, such that, upon frontal or lateral loading of the support arm, the latter will yieldingly deflect to a collapsed position and, upon removal of the loading, automatically return to its initial position.

These and other objects will be apparent to one skilled in the art upon reading the following detailed description, reference being made to the accompanying drawings in which.

Figure 1:
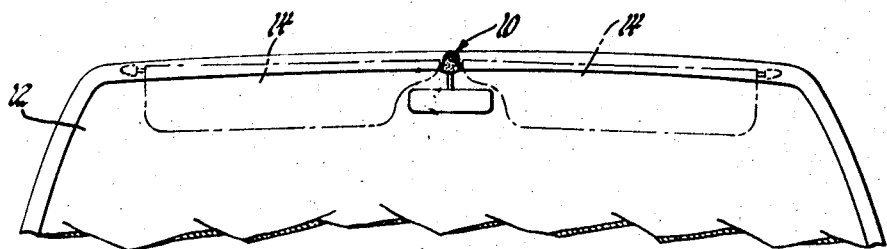
FIGURE 1 shows a rearview mirror assembly made in accordance with the present invention and mounted within a vehicle.

Referring to FIGURE 1, a rearview mirror assembly 10, made in accordance with the present invention, is shown centrally mounted interiorly of a vehicle adjacent the upper portion of the windshield 12, and supporting the inboard ends of conventional sun visors 14.

Figure 3:
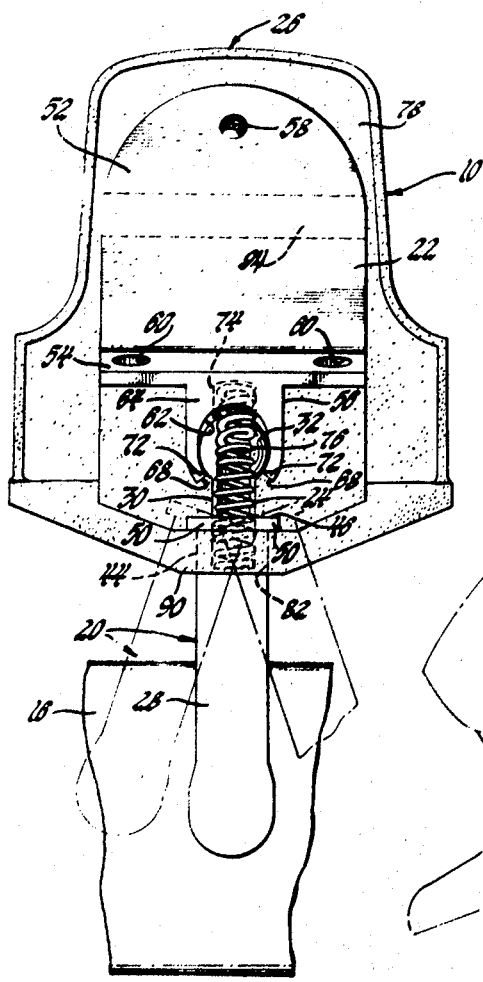
FIGURE 3 is a rearview taken along line 3—3 of FIGURE 2.
Figure 2:
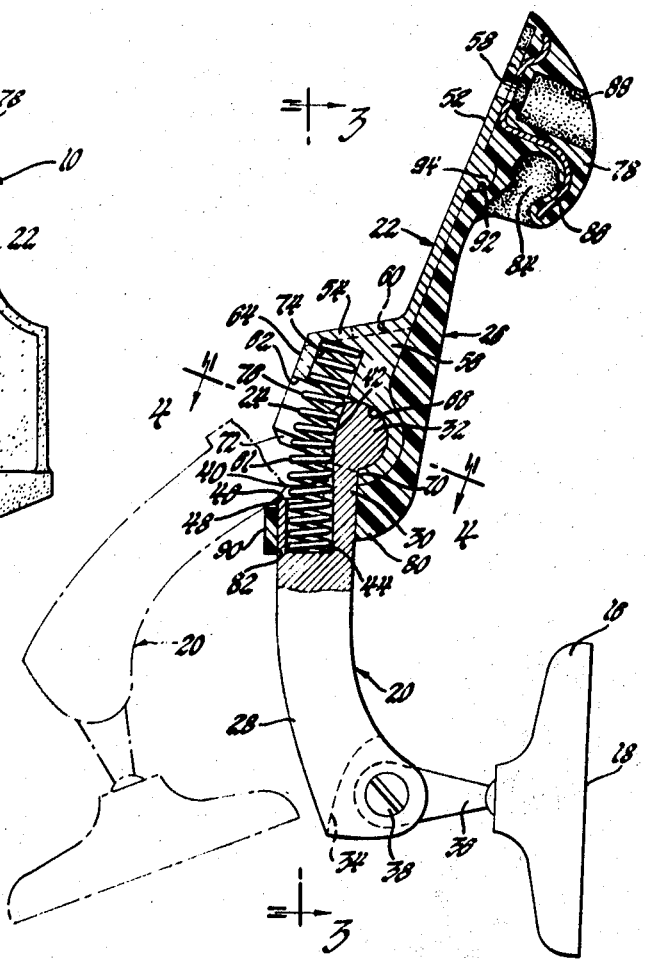
FIGURE 2 is a partially sectioned side view of the rearview mirror assembly shown in FIGURE 1.
Figure 4:
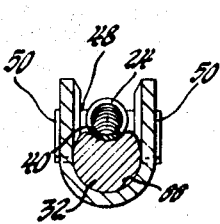
FIGURE 4 is a cross-sectional view taken along line 4—4 of FIGURE 2.

As shown more clearly in FIGURES 2 and 3, the rearview mirror assembly 10 generally comprises a conventional mirror body 16 having reflecting surface 18, a mirror support arm 20, a mounting bracket 22, a compression spring 24, and a resilient frontal covering 26. The support arm 20 is preferably a chromium-plated zinc die casting and comprises a contoured support horn 28 and a neck 30 of reduced cross-sectional area terminating with a ball end 32. The contoured support horn 28 is frontally slotted at 34 to receive the support stud 36 of the mirror body 16 that is adjustably attached thereto by means of a screw 38. A groove 40, having a semi-cylindrical cross section, is formed along the rear surface of the neck 30 and the ball end 32. The groove 40 terminates with a ramped portion 42 inwardly inclined with respect to the neck 30. A bore 44, registering with the groove 40, is formed in the end face 46 of the support horn 28. As shown in FIGURE 4, a stop shoulder 48 is formed at the juncture of the support horn 28 and neck 30 and has a pair of generally rectangular laterally spaced retaining flanges 50. As will be described below, the flanges 50 engage the mounting bracket 22 to limit movement of the support arm 20 and also serve to secure the lower portion of the covering 26.

The mounting bracket 22 comprises a generally U-shaped upper plate 52 integrally formed with a rearwardly inclined mounting ledge 54 and a retainer block 56. An aperture 58 and laterally spaced apertures 60 are respectively formed in upper plate 52 and in the mounting ledge 54, and are provided to permit attachment of the rearview mirror assembly 10 to the interior of the vehicle by means of suitable fasteners. The retainer block 56 is centrally located with respect to the upper plate 52 and the mounting ledge 54 and extends outwardly therefrom. A cylindrical sleeve 62, formed in the rear face 64 of the retainer block 56, terminates in a semi-spherical socket 66 that is adapted to embrace ball end 32. The ball end 32 and socket 66 form a ball and socket connection that permits limited universal rotation of the support arm 28 about the mounting bracket 22. The socket 66 forms a spherical surface having a first axis transverse of the mounting bracket and a second axis coaxial with the sleeve 52. A generally U-shaped opening having an included angle substantially less than 180° with respect to the axis of the cylindrical sleeve 62 is formed along the outward axial surface of the sleeve 62. The opening thus formed establishes stop surfaces 68 and seating surface 70 extending radially outwardly of the sleeve 62 and the socket 66. It will be appreciated that the socket 66 securely retains the ball end 32 in all directions except outwardly of the sleeve. As will be described below, such movement is restrained by the biasing of spring 24. Additionally, beveled abutment surfaces 72 are formed adjacent the rear face 64 and stop surfaces 68. The stop surfaces 68, in combination with abutment surfaces 72, limit universal movement of the ball end 32 about socket 66. A bore 74, relatively sized to receive the other end of the spring 24 and formed at the inward axial surface of sleeve 62, is adapted to register, in assembly, with the ramped portion 42 of the groove 40. Thus, it will be noted that the bore 74 is axially inclined with respect to bore 44.

To assemble the support arm 20 to the mounting bracket 22, the ball end 32 is inserted downwardly in the sleeve 62 until it engages the semi-spherical socket 66. The opposite ends of the compression spring 24 are then inserted within bores 44 and 74. Because the spring 24 is compressively retained between the mounting bracket 22 and the support arm 20 and its ends are axially offset, its mid-portion 76 located in groove 34, laterally biases the ball end 32 into positive frictional engagement with the semi-spherical socket 66. In the assembled position, the ball end 32 is securely seated against socket 66 and the neck 30 is laterally and inwardly restrained by engagement with seating surface 70.

The covering 26, molded from vinyl or other suitable materials, frontally covers the mounting bracket 22 and the upper end of the support arm 20 thereby preventing frontal exposure of any sharp edges as well as providing a contoured appearance for the mirror assembly. The covering 26 includes an upper cap portion 78 and a lower portion 80 having an opening 82 formed therein adapted to receive and encircle the upper part of the support horn 28. The cap portion 78 includes laterally and downwardly opening wells 84 adapted to receive the inboard ends of the sun visors 14. An integrally molded spring member 86 biases the sun visor wells 84 into compressive engagement with the ends of the sun visors 14 to securely retain the latter. An aperture 88, registering with aperture 58, is formed in the cap assembly to permit suitable attachment of the plate 52 and the cap 78 to the interior of the vehicle. The lower portion 80 of the covering 26 is retained in place by engagement of collar portion 90 with the flanges 50 adjacent the opening 82. The cap 78 is longitudinally located with respect to the plate 52 by means of a laterally extending groove 92 and the rib 94 arrangement.

The rearview mirror assembly 10 is attached to the vehicle by first securing the mounting ledge 54 by means of bolts inserted through apertures 60. Thereafter, the upper plate 52 and the cap 78 are attached by a cap screw, or other suitable fastening means, inserted through apertures 88 and 58.

As shown by the phantom position in FIGURE 2, upon frontal impact to the mirror body 16, the support arm 20 will rotate about a traverse axis passing through the center of the ball end 32 and against the force of spring 24 until limited by stop shoulder 48 engaging abutment surfaces 72. Similarly and as shown by the phantom positions in FIGURE 3, a lateral force will rotate the support arm 20 about the axis of the cylindrical sleeve 62 until the neck 30 engages the stop surfaces 68. After the force is removed from the mirror body 16, the support arm 29 will be automatically returned to its initial position by the biasing effect of the spring 24. The spring rate and amount of initial compression can be selected in a manner well known in the art to achieve the above-described results. Thus, it will be appreciated that the present invention provides a mirror assembly that will resistingly deflect under multi-directional loading conditions and one which will subsequently return to its original position after the loading has been removed without structural damage to the support assembly.

What is claimed is:

1. A vehicle rearview mirror assembly, comprising: a mounting bracket adapted to be attached to the interior of the vehicle, a semi-socket portion formed in one face at an end portion of the mounting bracket, a support arm having a ball portion formed at one end, a mirror body including a reflecting surface connected to the other end of the support arm, said ball portion adapted to be received within and frictionally engaged by the semi-socket portion, a spring member having a first end portion connected to the support arm and a middle portion engaging the ball portion opposite the semi-socket portion, and a second end portion of the spring member connected to the mounting bracket inwardly of said first end and said ball portion, said spring member biasing said ball portion into frictional engagement with the semi-socket portion and yieldingly connecting the mounting bracket and the support arm.

2. A vehicle rearview mirror assembly, comprising: a mounting bracket adapted to be attached to the interior of the vehicle, a semi-socket portion formed in one face at an end portion of the mounting bracket, a support arm having a ball portion formed at one end, a mirror body including a reflecting surface connected to the other end of the support arm, said ball portion adapted to be received within and frictionally engaged by the semi-socket portion, a U-shaped opening formed in the end face of said end portion of said mounting adjacent said semi-socket portion, said U-shaped opening defining laterally spaced side walls and an interconnected seating surface, said seating surface normally engaging the support arm in assembly to limit rotation in one direction about a first axis, said side walls having an included angle with respect to a second axis normal to the first axis of less than 180°, said side walls adapted to engage the support arm to limit rotation about the second axis, said side walls terminating at abutment surfaces adapted to engage the support arm to limit rotation in the other direction about the first axis, a spring member having a first end portion connected to the support arm and a middle portion engaging the ball portion opposite the semi-socket portion, and a second end portion of the spring member connected to the mounting bracket inwardly of the first end of the spring member and said ball portion, said spring member biasing said ball portion into frictional engagement with the semi-socket portion and said support arm against said seating surface, said spring member yieldingly connecting the mounting bracket and the support arm thereby permitting said support arm to deflect upon application of a force to said mirror body within the limits of rotation established by said side walls and said abutment surfaces.

3. A vehicle rearview mirror assembly, comprising: a mounting bracket adapted to be attached to the interior of the vehicle, a semi-socket portion formed in one face at an end portion of the mounting bracket and having a first axis parallel to the mounting bracket and second axis normal to said first axis, a support arm having a ball portion formed at one end and a mirror body including a reflecting surface connected to the other end, said ball portion adapted to be received within and frictionally engaged by the semi-socket portion, a U-shaped opening formed in the end face of said end portion of said mounting bracket adjacent said semi-socket portion, said U-shaped opening defining laterally spaced side walls and an interconnected seating surface, said seating surface normally engaging the support arm in assembly to limit rotation in one direction about said first axis, said side walls having an included angle with respect to said second axis less than 180°, said side walls adapted to engage the support arm to limit rotation about the second axis, said said walls terminating at abutment surfaces adapted to engage the support arm to limit rotation of the support arm in the other direction about the first axis, a groove formed in said support arm and said ball portion, said groove terminating in a portion inclined inwardly of the ball portion, a coiled spring having a first end portion connected to the support arm and a middle portion engaging said groove opposite the semi-socket portion, and a second end portion of the coiled spring connected to the mounting bracket inwardly of the first end of the coiled spring and said ball portion, said coiled spring yieldingly connecting the mounting bracket and the support arm and biasing said ball portion into frictional engagement with the semi-socket portion and said support arm against said seating surface thereby permitting said support arm to deflect upon application of a force to said mirror body within the limits of rotation established by said side walls and said abutment surfaces.

References Cited
FOREIGN PATENTS
1,236,575   6/1960   France.

ROY D. FRAZIER, Primary Examiner

F. DOMOTOR, Assistant Examiner

U.S. Cl. X.R.

248—204